United States Patent
Biswas et al.

(10) Patent No.: US 9,582,260 B2
(45) Date of Patent: Feb. 28, 2017

(54) METHOD AND APPARATUS FOR REMOTE PURCHASE, INSTALLATION, AND LICENSING OF SOFTWARE

(71) Applicant: Adobe Systems Inc., San Jose, CA (US)

(72) Inventors: Sanjeev Kumar Biswas, Bangalore (IN); Vikalp Gupta, Naya Bazaar (IN); Amrita Chakrabarti, Kolkata (IN); Ashish Kumar Agarwal, Meerut (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 432 days.

(21) Appl. No.: 13/739,157

(22) Filed: Jan. 11, 2013

(65) Prior Publication Data

US 2014/0201730 A1   Jul. 17, 2014

(51) Int. Cl.
  *G06F 9/445* (2006.01)
(52) U.S. Cl.
  CPC .................................. *G06F 8/61* (2013.01)
(58) Field of Classification Search
  CPC .................................................. G06F 8/61
  USPC ........................................................ 717/178
  See application file for complete search history.

(56) References Cited

U.S. PATENT DOCUMENTS

| | | | | |
|---|---|---|---|---|
| 5,881,236 A * | 3/1999 | Dickey | ....................... | G06F 8/61 717/176 |
| 6,144,960 A * | 11/2000 | Okada | ....................... | G06F 8/61 709/227 |
| 7,478,385 B2 * | 1/2009 | Sierer | ....................... | G06F 8/61 717/168 |
| 7,707,573 B1 * | 4/2010 | Marmaros | ................. | G06F 8/61 717/178 |
| 8,074,216 B2 * | 12/2011 | Tamura | ......................... | 717/174 |
| 8,595,186 B1 * | 11/2013 | Mandyam | ................. | G06F 8/38 717/178 |
| 9,002,864 B1 | 4/2015 | Payne | | |
| 2003/0217358 A1 * | 11/2003 | Thurston | .................. | G06F 8/60 717/174 |
| 2006/0048141 A1 * | 3/2006 | Persson et al. | ............... | 717/176 |
| 2007/0094501 A1 * | 4/2007 | Takamizawa et al. | ........ | 713/170 |
| 2008/0184221 A1 * | 7/2008 | Rengarajan et al. | ......... | 717/173 |
| 2008/0244057 A1 | 10/2008 | Kojima | | |
| 2009/0007091 A1 * | 1/2009 | Appiah et al. | ................ | 717/171 |
| 2009/0106266 A1 | 4/2009 | Donatelli et al. | | |

(Continued)

OTHER PUBLICATIONS

Callaghan et al. "Client-server architecture for collaborative remote experimentation", 2005, IEEE.*

(Continued)

*Primary Examiner* — Wei Zhen
*Assistant Examiner* — Junchun Wu
(74) *Attorney, Agent, or Firm* — Keller Jolley Preece

(57) ABSTRACT

A method and apparatus for remote purchase, installation, and licensing of software is disclosed. The method comprising receiving, from a mobile device, a request for a software application; determining compatibility between at least one registered device and the software application; providing, to the mobile device, a list comprising compatible registered devices; placing the software application on an installation queue for the selected registered device in response to an input; and downloading the queued software application to the registered device.

20 Claims, 3 Drawing Sheets

(56) References Cited

U.S. PATENT DOCUMENTS

| | | | |
|---|---|---|---|
| 2009/0259734 A1 | 10/2009 | Morikawa | |
| 2009/0282398 A1* | 11/2009 | Shen et al. | 717/174 |
| 2009/0288079 A1* | 11/2009 | Zuber et al. | 717/176 |
| 2010/0049838 A1 | 2/2010 | DeHaan | |
| 2010/0071039 A1* | 3/2010 | Kashima | H04N 1/00244 |
| | | | 726/5 |
| 2010/0262953 A1* | 10/2010 | Barboni et al. | 717/120 |
| 2011/0154135 A1* | 6/2011 | Tyhurst et al. | 717/177 |
| 2011/0175977 A1 | 7/2011 | Dahl | |
| 2011/0185043 A1* | 7/2011 | Zeller | G06F 9/44521 |
| | | | 709/219 |
| 2012/0096365 A1* | 4/2012 | Wilkinson | G06F 9/468 |
| | | | 715/740 |
| 2013/0019234 A1* | 1/2013 | Pardehpoosh et al. | 717/170 |
| 2013/0019237 A1* | 1/2013 | Pardehpoosh | G06Q 30/0609 |
| | | | 717/171 |
| 2013/0047150 A1* | 2/2013 | Malasky | G06F 9/44547 |
| | | | 717/176 |
| 2014/0085652 A1 | 3/2014 | Yoshida et al. | |
| 2014/0173586 A1* | 6/2014 | Dugan | G06F 8/65 |
| | | | 717/173 |
| 2014/0215344 A1 | 7/2014 | Ligman et al. | |
| 2015/0082024 A1 | 3/2015 | Smith | |
| 2015/0095905 A1 | 4/2015 | Chakrabarti et al. | |
| 2015/0288761 A1 | 10/2015 | Lu | |

OTHER PUBLICATIONS

Blanco et al. "Remote Data Service Installation on a Grid-enabled Java Platform", 2005, IEEE.*
U.S. Appl. No. 14/041,333, Feb. 12, 2016, Preinterview 1st Office Action.
U.S. Appl. No. 14/041,333, Apr. 12, 2016, Office Action.

* cited by examiner

METHOD AND APPARATUS FOR REMOTE PURCHASE, INSTALLATION, AND LICENSING OF SOFTWARE

BACKGROUND OF THE INVENTION

Field of the Invention

Embodiments of the present invention generally relate to software purchase and, more particularly, to a method and apparatus for remote purchase, installation, and licensing of software.

Description of the Related Art

Software purchase and installation for a device requires a user to be physically present on the device for which the purchase is made. Generally, software is purchased on computer readable media, such as a CD-ROM, flash drive and the like, or downloaded to a local hard drive on the device, for example from an Internet location. Installation of the software generally requires providing user details before making an online purchase. All activities related to download, installation and purchase are triggered from the device, and require the user's presence at the device.

Further, for multiple devices with different platform (e.g., WINDOWS® OS, MAC® OS, or LINUX® OS, among others), the user needs to download different installation files corresponding to each platform. The user is required to access devices individually, one by one, for completing software installation corresponding to that device's operating system. This procedure is quite tedious and time consuming for the user.

In certain instances, a user may purchase a software that is incompatible with the device (e.g., due to hardware or software configuration of the device). There is a significant inconvenience associated with discovering that the software is incompatible and possibly revoking the software purchase, for the user and the software provider.

Therefore, there is a need for a method and apparatus for remote purchase, installation, and licensing of software.

SUMMARY OF THE INVENTION

A method and apparatus for remote purchase, installation, and licensing of software substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
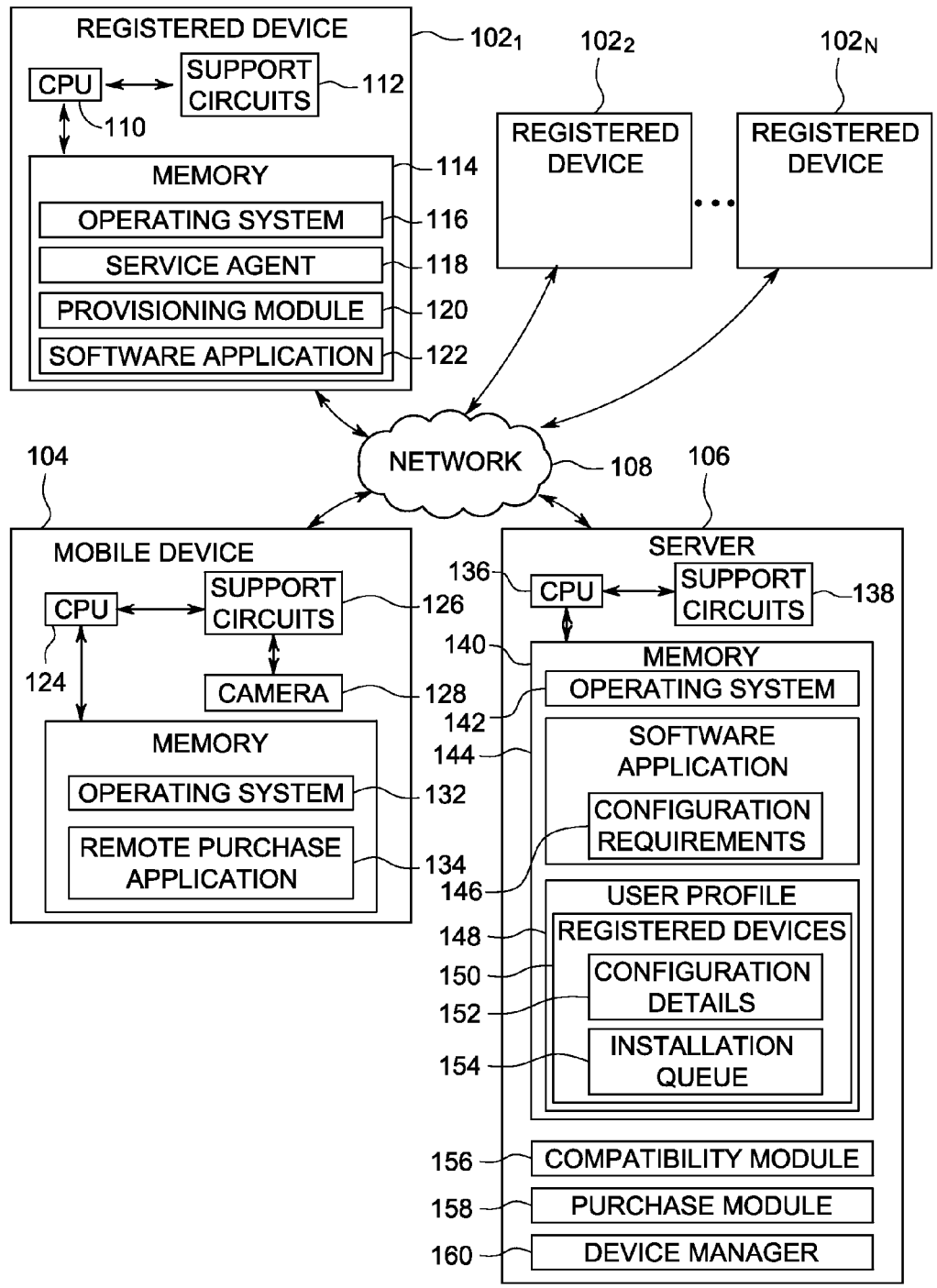
FIG. 1 depicts a block diagram of a system for remote purchase, installation, and licensing of a software, according to one or more embodiments of the invention.

While the method and apparatus is described herein by way of example for several embodiments and illustrative drawings, those skilled in the art will recognize that the method and apparatus for remote purchase, installation, and licensing of software are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for remote purchase, installation, and licensing of software as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for remote purchase, installation, and licensing of software. Embodiments of the invention enable a user to remotely purchase a software application using a mobile device and further enable the user to select a registered device on which the user would like to have the software installed. A user has one or more devices on which software may be loaded. When the user logs into a software store's server from one of the user's devices, the device is registered on the server of the software store. A list of software applications and/or products that are installed on the device are registered on the server as well. Information regarding the hardware and software capabilities and limitations of the device are also stored on the software store's server. A daemon process is downloaded onto the registered device and runs continuously as long as the user remains logged on to the software store's server. The user may log onto the software store's server from any number of devices. Each device is registered with the software store's server and the daemon process runs on each registered device for as long as the user remains logged onto the software store's server from that registered device.

A user may then use a mobile device to purchase a software application to be installed on one of the user's registered devices. Software application, as used herein, mean any software application, software update, or software patch. When the server receives a selection of a software application, the server retrieves a list of all of a user's registered devices. For each registered device, the server determines if the configuration of the registered device, including but not limited to, hardware and software configuration, is compatible with the configuration requirements of the software application. If the software application is incompatible with the selected registered device, for example, if the software application is for running on a WINDOWS® machine, and the selected registered device is a MAC® machine, the registered device is considered to be incompatible. The server provides the list of registered devices to the mobile device. In some embodiments, the mobile device displays all registered devices, but only makes the compatible devices selectable for software installation. However, if there are no compatible devices, the mobile device displays an error message to the user. If there are compatible registered devices, the user may select a registered device on which to install the software application. Upon successful purchase of the software application, the server adds an entry for the software application to an installation queue of the registered device. The installation queue is a list of software applications to be installed on the selected registered device.

In some embodiments, the daemon process that is running on the registered device is continuously checking the installation queue on the server for software applications awaiting installation on the registered device. When the daemon process discovers a software application awaiting installation, it downloads, installs, and licenses the software application. When the user returns to the registered device on which the software application was installed, the software application purchased from the user's mobile device is ready for use.

In an alternate embodiment, a device remains registered with the server after the user has logged off. Purchased software applications may continue to be placed on the installation queue for the device, however, the application is not installed on the device until the user logs into the server and the daemon process checks the installation queue of the device.

Various embodiments provide a method and apparatus for remote purchase, installation, and licensing of software offer various advantages. The embodiments provide a seamless experience to a user to purchase and install the software remotely on a registered device through a mobile device. The proposed embodiments save time and effort. For example, the proposed embodiments allow a user to leverage their time while mobile, e.g., while travelling, to get entire installation done though a mobile device. The proposed embodiments download/install the software, perform remote provisioning (e.g., through activation, or serialization etc.), without requiring the user's physical presence at the registered device. The software is ready for launch and use when the user accesses the registered device after having installed the software remotely.

Various embodiments of a method and apparatus for remote purchase, installation, and licensing of software are described. In the following detailed description, numerous specific details are set forth to provide a thorough understanding of the claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for remote purchase, installation, and licensing of software, according to one or more embodiments of the invention. The system 100 comprises one or more registered devices $102_1$, $102_2, \ldots, 102_N$ (collectively 102), a mobile device 104, and a server 106 communicably coupled to each other through a network 108.

The registered device 102 is a type of computing device (e.g., a laptop, a desktop, a Personal Digital Assistant (PDA), a tablet, a Smartphone, and/or the like). The registered device 102 comprises a CPU 110, support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, displays, and the like. The memory 114 comprises at least one of Read Only Memory (ROM), Random Access Memory (RAM), disk drive storage, optical storage, removable storage and/or the like. The memory 114 comprises an operating system 116, a service agent 118, a provisioning module 120, and a software application 122.

According to some embodiments of the invention, the operating system 116 is a computer operating system. The operating system 116 generally manages various device resources (e.g., network resources, file processors, and/or the like). The operating system 116 is configured to execute operations on one or more hardware and/or software modules, such as the provisioning module 120, the service agent 118 and/or the like. Examples of the operating system 116 include, but are not limited to, WINDOWS® OS, MAC® OS, or LINUX® OS, among others.

The mobile device 104 is a computing device typically used when a user is mobile, and the mobile device includes devices such as, a Personal Digital Assistant (PDA), a Smartphone, Palmtop, Pocket PC, a tablet and the like. The mobile device 104 comprises a CPU 124, support circuits 126, a camera 128 and a memory 130. The CPU 124 may comprise one or more commercially available microprocessors or microcontrollers that facilitate data processing and storage. The various support circuits 126 facilitate the operation of the CPU 124 and include one or more clock circuits, power supplies, cache, input/output circuits, displays, and the like. The memory 130 comprises at least one of Read Only Memory (ROM), Random Access Memory (RAM), disk drive storage, optical storage, removable storage and/or the like. The memory 130 comprises an operating system 132, and a remote purchase application 134.

According to some embodiments of the invention, the operating system (OS) 132 is a mobile operating system. The operating system 132 generally manages various device resources (e.g., network resources, file processors, and/or the like). The operating system 132 is configured to execute operations on one or more hardware and/or software modules, such as the camera 128, the remote purchase application 134 and/or the like. Examples of the operating system 134 include, but are not limited to, ANDROID™ from GOOGLE® Inc., BLACKBERRY® OS from RIM®, iOS from APPLE® Inc., SYMBIAN® OS from NOKIA®, and/or the like.

The server 106 is a type of computing device (e.g., a laptop, a desktop, and/or the like). The server 106 comprises a CPU 136, support circuits 138 and a memory 140. The CPU 136 may comprise one or more commercially available microprocessors or microcontrollers that facilitate data processing and storage. The various support circuits 138 facilitate the operation of the CPU 136 and include one or more clock circuits, power supplies, cache, input/output circuits, displays, and the like. The memory 140 comprises at least one of Read Only Memory (ROM), Random Access Memory (RAM), disk drive storage, optical storage, removable storage and/or the like. The memory 140 comprises an operating system 142, a plurality of software applications 144, a plurality of user profiles (user identification information) 148, a compatibility module 156, and a purchase list module 158. Each software application 144 comprises configuration requirements 146. Each user profile 148 comprises a plurality of user registered devices 150. Each user registered device 150 comprises configuration details 152 an installation queue 154, and a device manager 160.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet or Intranet using various communications infrastructure, such as Ethernet, Wi-Fi, Wi-Max, General Packet Radio Service (GPRS), and the like.

When a user logs into the server 106, the device from which the user logs in becomes a registered device 102. The device manager 160 places the registered device 102 onto a list of registered devices 150 for the user in the user's user profile 148. Hardware and software details regarding the registered device 102 are stored with the list of registered devices 150 as configuration details 152 for the registered device 102. Configuration details 152 comprise hardware/software information, such as RAM, storage, graphics card, processor, OS version of the registered device 102 and also includes any software applications and/or products installed on the registered device 102.

A service agent 118 is downloaded from the server 106 and installed on the registered device 102. In some embodiments, the registered device 102 has a preinstalled service agent 118 on the registered device 106. For example, when a user creates an ADOBE® account, ADOBE® Application Manager (AAM) is installed on the user's device. The service agent 118 is a daemon process that runs in the background on the registered device 102.

After a user has one or more registered devices 102, the user may then use a mobile device 104 to purchase a software application 144 to be installed on one of the user's registered devices 102. In some embodiments, the camera 128 is utilized for scanning various codes, such as a QR code, a barcode, and the like that is associated with the software application 144 to be purchased. The camera 128 passes the scanned code to the remote purchase application 134. The QR code or barcode includes product identification information, and may include other information, such as links to promotional material about the software. For example, in some embodiments, software manufacturers display a QR code in an advertisement for a software application, such as advertisements on websites, print media such as newspapers or magazines, and other media generally known in the art, that increase the awareness about the software to the users. Further, the software manufacturers may also provide "learn more" links or other educational material within the QR code.

The user cannot only simply and quickly scan the QR code from the mobile device 104 to obtain information about the software through the educational audios/videos associated with the QR code, but to also trigger a remote software purchase from the mobile device 104. In some embodiments, the user provides a product key (for example, obtained from a software retail store) using a keyboard or other data input facility of the mobile device (that is, without using the camera 128) for initiating the software purchase. Those skilled in the art would appreciate that various types of codes and input means generally known in the art other than scanning the QR code (e.g., via a camera) or providing product keys (e.g., via keyboard or other input means), may be utilized for initiating the software purchase from the mobile device 104 without departing from the scope and spirit of the present invention. When a user in interested in a software application, the remote purchase application 134 facilitates a user login to the server 106.

The compatibility module 156, retrieves a list of user registered devices 150 from a user profile 148 for the user requesting the purchase. The compatibility module 156 accesses the configuration requirements 146 for the software application 144 and the configuration details 152 for each registered device 102 and determines whether the configuration details 152 of the registered device 102, meet the configuration requirements 146 of the software application 144. For example, if the software application 144 is designed to run on a WINDOWS platform, and a registered device 102 is a MAC® machine, the registered device is not compatible. The compatibility module 156 provides the mobile device 104 with the list of user registered devices 150 including which registered devices 150 are compatible with the software application of interest and a list of software applications, including version numbers, already installed on each registered device 150. The remote purchase application 134 displays the list. In some embodiments, the remote purchase application 134 displays only those registered devices 150 that are compatible with the software applications. In some embodiments, the remote purchase application 134 displays all registered devices 150, but only makes selectable the compatible devices on which the software application can be installed. If there are no compatible registered devices 150, the remote purchase application 134 displays an appropriate message to the user. In some embodiments, the remote purchase application 134 provides recommendations to the user based on the configuration of the registered devices 150. For example, if two registered desktop devices have the same configuration, the remote purchase application 134 may provide a recommendation to purchase the software application for both devices.

The user selects the registered device 102 on which the user would like the software application 144 to be installed. The purchase module 158 facilitates payment for the software application 144 and queues the software application 144 on the installation queue 154 to be installed on the registered device 102 in the list of selected user registered device 150.

The service agent 118 of the registered device 102 runs as a background process continually checking with the server 106 to determine whether any applications are on the installation queue for the registered device 102. When an application for download is on the installation queue 154 for the user registered device 102, the provisioning module 120 downloads the software application 122, on the registered device 102 and the purchase module 158 removes the software application entry from the installation queue 154. Upon successful download, the provisioning module 124 installs and licenses the application software 122. When a user returns to the registered device 102, the software application 122 is ready for use.

Figure 2:
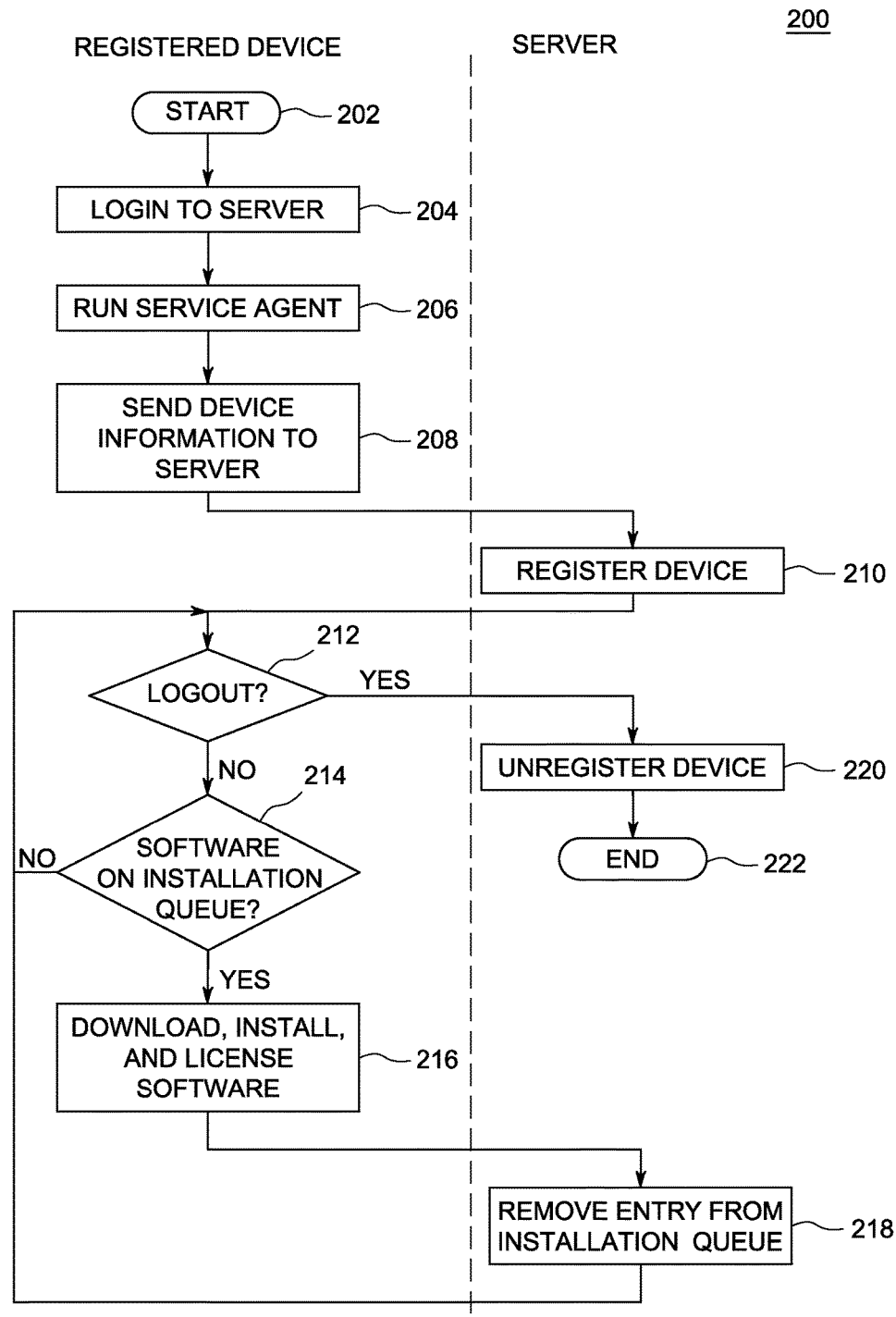
FIG. 2 depicts a flow diagram of a method for registering a device and checking for purchased applications to install as performed by the service agent of FIG. 1, according to one or more embodiments of the invention.

FIG. 2 depicts a flow diagram of a method 200 for registering a device and checking for purchased applications to install as performed by the service agent 118 of FIG. 1, according to one or more embodiments of the invention. The method 200 facilitates a user logging into the server. Upon login, the method 200 registers the device with the server and proceeds to check for software applications to install. Upon logging off, the device is unregistered on the server.

The method 200 starts at step 202 and proceeds to step 204. At step 204, the method 200 facilitates a user logging into the server. The method 200 proceeds to step 206, where the method 200 runs the service agent on the device. The service agent runs as a daemon process in the background on the device until the user logs off from the server. The method 200 proceeds to step 208, where the method 200 sends device information and configuration details to the server. The device information may include a device identifier, such as globally unique identifier (GUID), access token, machine ID, machine name, etc. The configuration information comprises hardware/software information, such as RAM, storage, graphics card, processor, OS version of the device. Device information also includes any software applications and/or products installed on the device, and the versions of said software applications and/or products.

The method 200 proceeds to step 210, where the method 200 registers the device. The method 200 stores the device information and the configuration details of the device on the server. Once the device is registered, a user may purchase a software application and have the installation of the software application directed to this or any other registered device. The method 200 proceeds to step 212.

At step 212, the method 200 determines whether the user has logged out of the server. If the method 200 determines that the user has not logged out of the server, the method 200 proceeds to step 214, where the method 200 determines whether there exist any software application entries on an installation queue on the server. When a software application is purchased and the registered device is selected as the device on which to install the software application, the software application is placed on an installation queue for the device. The method 200 may check the installation queue continuously or at predefined intervals. If the method 200 determines that one or more software application entries exist on the installation queue, the method 200 proceeds to step 216, where the method 200 downloads, installs, and licenses the software application on the registered device. The method 200 proceeds to step 218, where the method 200 removes the downloaded software application entry from the installation queue for the registered device. The method 200 proceeds to step 212.

If at step 214, the method 200 determines that there are no software applications on the installation queue for the registered device, the method 200 proceeds to step 212.

At step 212, if the method 200 determines that the user has logged out of the server, the method 200 proceeds to step 220, where the method 200 unregisters the device. The method 200 removes the device from a list of registered devices for the user. When a software application is purchased by a user, the device is no longer provided as a selectable device on which to install a software application. The method 200 proceeds to step 222 and ends.

Figure 3:
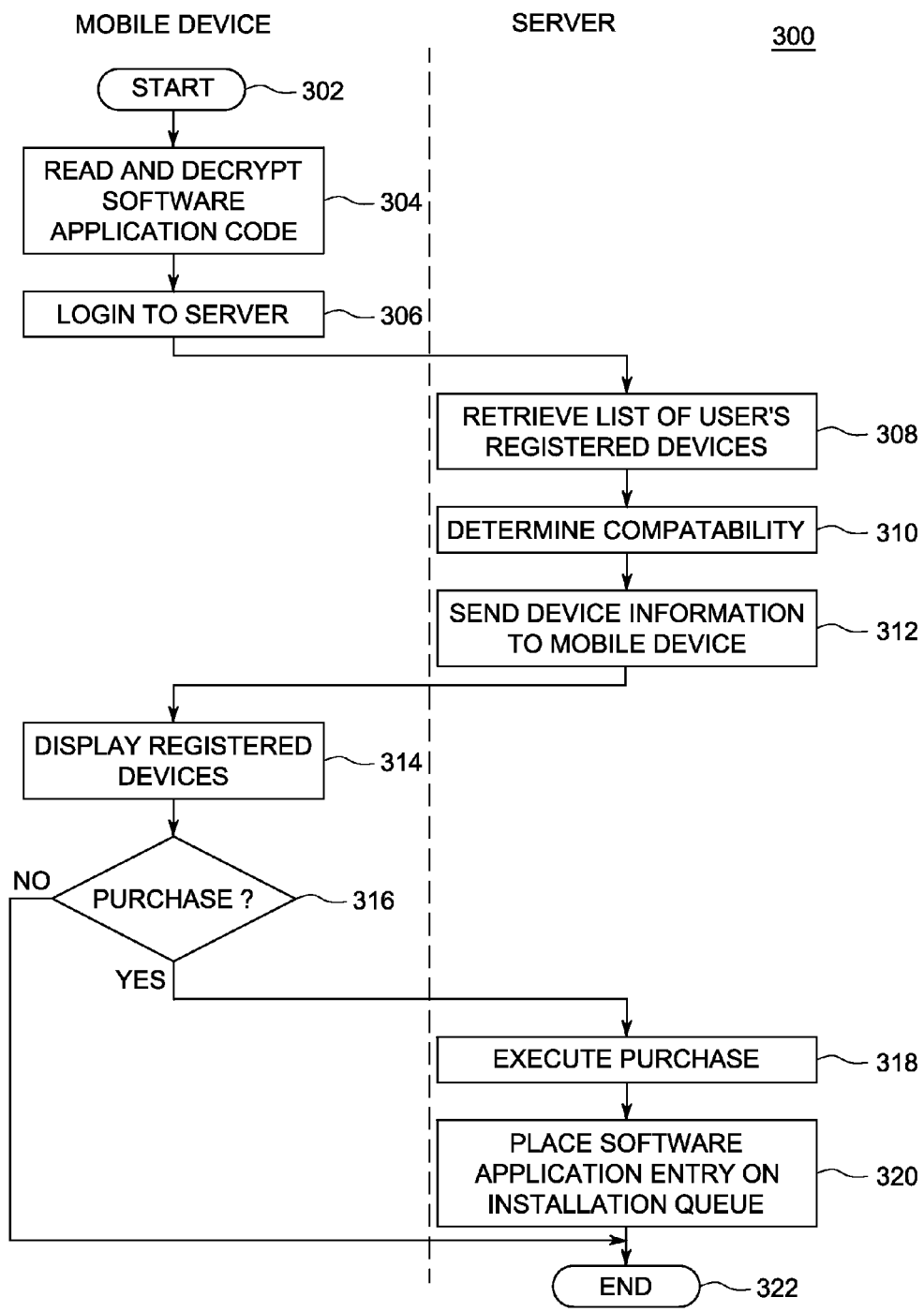
FIG. 3 depicts a flow diagram of a method for remote purchase of a software application, as performed by the remote purchase application, the compatibility module, and the purchase module of FIG. 1, according to one or more embodiments of the invention.

FIG. 3 depicts a flow diagram of a method 300 for remote purchase of a software application, as performed by the remote purchase application 134, the compatibility module 156, and the purchase module 158 of FIG. 1, according to one or more embodiments of the invention. The method 300 reads a code for a software application and, if a user is interested in the software application, the method 300 displays a list of compatible devices on which the software application may be installed. When a device is selected, an entry for the software application is placed on the installation queue for the selected device.

The method 300 starts at step 302 and proceeds to step 304. At step 304, a mobile device reads and decrypts a software application code. The code may be a bar code, a QR code, or any code capable of being captured and decrypted by a mobile device. The method 300 proceeds to step 306, where the method 300 redirects the user to a login screen to facilitate logging the user into a server where the software application may be purchased.

The method 300 proceeds to step 308, where the method 300 retrieves a list of registered devices associated with the user's login. Each device was registered when the user logged into the server from the device. The method 300 proceeds to step 310, where the method determines which registered devices are compatible with the software application. The method 300 accesses the configuration requirements for the software application and the configuration details for each registered device and determines whether the configuration details of the registered device, meet the configuration requirements of the software application. For example, if the software application is designed to run on a WINDOWS platform, and a registered device is a MAC® machine, the registered device is not compatible.

The method 300 proceeds to step 312, where the method 300 facilitates sending the list of registered devices from the server to the mobile device. The registered devices. The method 300 proceeds to step 314, where the method 300 displays the list of registered devices on the mobile device. In some embodiments, the method 300 displays only those registered devices that are compatible with the software application. In some embodiments, the method 300 displays all of the user's registered devices, but makes only the compatible registered devices selectable. The method 300 proceeds to step 316.

At step 316, the method 300 determines whether the software application is to be purchased. If no device is selected for installation, it is determined that no software application is to be purchased, and the method 300 proceeds to step 322 and ends. However, if the method 300 receives a selection of a device on which the user would like the software application installed, the method 300 determines the user is to purchase the application. In some embodiments, the method 300 provides a user interface (UI), wherein the user can select one or more desired registered device(s). The method 300 proceeds to step 318.

At step 318, the method 300 facilitates the purchase of the software application. The method 300 proceeds to step 320, where the method 300 adds an entry for the software application to the installation queue for the selected device. When a service agent on the registered device finds the entry for the software application on the installation queue, the software application is downloaded, installed and licensed on the registered device and the entry removed from the installation queue. The method 300 proceeds to step 322 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, in alternate embodiments, unless otherwise indicated, the method steps may be implemented in a different order than illustrated by the figures. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method comprising:
in response to detecting a plurality of devices of a user logging onto one or more servers:
registering each of the plurality of devices of the user; and
installing a service agent on each of the plurality of registered devices of the user to check an installation queue on the one or more servers for each of the plurality of devices;
receiving, at the one or more servers and from a mobile device of the user of the plurality of devices, a request to download a software application to at least one registered device of the user of the plurality of registered devices that is remote from the mobile device of the user;
determining, by the one or more servers, compatibility between the plurality of registered devices of the user and the software application;
providing, by the one or more servers, to the mobile device of the user, a list comprising compatible registered devices of the user, the list including the at least one registered device of the user from the plurality of registered devices of the user;
receiving, from the mobile device of the user, an indication of a selection by the user of the at least one registered device of the user from the list of compatible registered devices of the user;
placing, by the one or more servers, the software application on an installation queue for the at least one registered device of the user in response to receiving the selection, from the mobile device of the user, of the at least one registered device of the user;

receiving a request from the at least one registered device of the user, via the service agent installed on the at least one registered device, checking the installation queue on the one or more servers for software applications awaiting installation on the at least one registered device of the user; and downloading, by the one or more servers, the queued software application to the at least one registered device of the user in response to the request from the at least one registered device of the user.

2. The method of claim 1, wherein registering each of the plurality of devices of the user comprises storing a plurality of hardware and software configuration details for each of the plurality of devices.

3. The method of claim 2, wherein determining compatibility comprises ensuring the hardware and software configuration details of the at least one registered device meet a plurality of hardware and software requirements of the software application.

4. The method of claim 1, further comprising:
sending information regarding the compatibility to the mobile device; and
receiving a confirmation from the mobile device, for installation of the software application on the at least one registered device of the user.

5. The method of claim 3, further comprising: providing a purchase recommendation to the user, via the mobile device, based on the hardware and software configuration details of the at least one registered device.

6. The method of claim 1, wherein downloading the queued software application to the at least one registered device further comprises: in response to the request from the at least one registered device, facilitating remote installation and licensing of the software application on the at least one registered device such that when the user returns to the at least one registered device, the software application is ready for use on the at least one registered device.

7. A system for remote installation of a software application comprising:
one or more servers; and
at least one non-transitory computer-readable storage medium storing instructions thereon that, when executed by the one or more servers, cause the system to:
in response to detecting a plurality of devices of a user logging onto one or more servers:
register each of the plurality of devices of the user; and
install a service agent on each of the plurality of registered devices of the user to check installation queue on the one or more servers for each of the plurality of devices;
receive, from a mobile device of the user of the plurality of devices, a request for a software application to be installed on a registered device of the user of the plurality of registered devices that is remote from the mobile device of the user from which the request for the software application is received;
determine compatibility of the software application and the registered device of the user;
facilitate payment for the software application;
place the software application on an installation queue for the registered device of the user based on the registered device of the user being determined to be compatible with the software application; and in response to receiving a request from the registered device of the user, via the service agent installed on the at least one registered device, download the software application to the registered device of the user based on receiving a request from the registered device of the user to check the installation queue for software applications awaiting installation on the registered device.

8. The system of claim 7, further comprising instructions that cause the system to register each of the plurality of devices of the user by storing a plurality of hardware and software configuration details for each of the plurality of devices of the user.

9. The method of claim 1, wherein installing the service agent on each of the plurality of devices of the user further comprises
downloading, by the one or more servers, the service agent onto the at least one registered device, the service agent comprising a daemon process that runs in the background of the at least one registered device that checks with the one or more servers if there are any applications on the installation queue for the at least one registered device.

10. The method of claim 1, wherein providing the list comprising compatible registered devices includes providing a list of all registered devices for display on the mobile device, such that the compatible registered devices on the list are selectable for software installation and registered devices that are not compatible on the list are not selectable for software installation.

11. The method of claim 2, wherein registering the at least one registered device comprises receiving and storing a device identifier and an OS version of the at least one registered device.

12. The system of claim 7, wherein the instructions cause the system to determine compatibility by ensuring the hardware and software configuration details of the registered device meet a plurality of hardware and software requirements of the software application.

13. The system of claim 7, further comprising instructions that the cause the system to send information regarding the compatibility to the mobile device; and receive a confirmation from the mobile device, for installation of the software on the registered device of the user.

14. The system of claim 7, further comprising instructions that cause the system to download the software application to the registered device of the user by facilitating remote installation and licensing of the software application on the registered device such that when the user returns to the registered device, the software application is ready for use on the at least one registered device.

15. A non-transitory computer readable storage medium for storing computer instructions that, when executed by at least one processor cause the at least one processor to perform a method for remote purchase and installation of a software application comprising:
in response to detecting a plurality of devices of a user logging onto one or more servers:
registering each of the plurality of devices of the user; and
installing a service agent on each of the plurality of registered devices of the user to check an installation queue on the one or more servers for each of the plurality of devices;
receiving, from a mobile device of the user of the plurality of devices of the user, a request to download a software application to at least one registered device of the user of the plurality of registered devices of the user that is remote from the mobile device of the user;

determining compatibility between the plurality of registered devices of the user and the software application;

providing, to the mobile device of the user, a list comprising compatible registered devices of the user, the list including the at least one registered device of the user;

receiving, from the mobile device of the user, an indication of a selection by the user of the at least one registered device of the user from the list of compatible registered devices of the user;

placing the software application on an installation queue for the at least one registered device of the user in response to receiving the selection, from the mobile device of the user, of the at least one registered device of the user;

receiving a request from the at least one registered device of the user, via the service agent installed on the at least one registered device, checking the installation queue on the one or more servers for software applications awaiting installation on the at least one registered device of the user; and downloading, by the one or more servers, the queued software application to the at least one registered device of the user in response to the request from the at least one registered device of the user.

16. The computer readable medium of claim 15, wherein registering each of the plurality of devices of the user comprises storing a plurality of hardware and software configuration details for each of the plurality of devices of the user.

17. The computer readable medium of claim 16, wherein determining compatibility comprises ensuring the hardware and software configuration details of the at least one registered device meet a plurality of hardware and software requirements of the software application.

18. The computer readable medium of claim 15, further comprising instructions that, when executed by the at least one processor, cause the at least one processor to further perform steps comprising:

sending information regarding the compatibility to the mobile device; and receiving a confirmation from the mobile device, for installation of the software on the at least one registered device of the user.

19. The computer readable medium of claim 15, further comprising instructions that, when executed by the at least one processor, cause the at least one processor to further perform steps comprising: completing a purchase transaction before placing the software application on the installation queue.

20. The computer readable medium of claim 15, wherein downloading comprises facilitating remote installation and licensing of the downloaded software application on the at least one registered device.

* * * * *